(12) United States Patent
Yalagandula et al.

(10) Patent No.: US 11,171,846 B1
(45) Date of Patent: Nov. 9, 2021

(54) LOG THROTTLING

(71) Applicant: VMware, Inc., Palo Alto, CA (US)

(72) Inventors: Praveen Yalagandula, San Francisco, CA (US); Chao Li, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/025,753

(22) Filed: Jul. 2, 2018

Related U.S. Application Data

(60) Provisional application No. 62/670,996, filed on May 14, 2018.

(51) Int. Cl.
*H04L 12/26* (2006.01)
*H04L 12/24* (2006.01)
*H04L 29/06* (2006.01)

(52) U.S. Cl.
CPC .......... *H04L 43/024* (2013.01); *H04L 41/046* (2013.01); *H04L 41/0816* (2013.01); *H04L 43/04* (2013.01); *H04L 43/062* (2013.01); *H04L 63/0272* (2013.01)

(58) Field of Classification Search
CPC . H04L 43/024; H04L 41/0816; H04L 41/046; H04L 43/062; H04L 43/04; H04L 63/0272; H04L 29/08846; H04L 29/08837; H04L 45/586; H04L 49/70; H04L 43/02; H04L 43/022; Y02D 10/26; Y10S 379/901; G06F 9/45533; G06F 2009/4557; G06F 2009/45575; G06F 2009/45595; G06F 11/1484; G06F 11/301; G06F 9/5077; G06F 2009/45591
See application file for complete search history.

(56) References Cited

U.S. PATENT DOCUMENTS

| | | | |
|---|---|---|---|
| 9,483,286 B2 | 11/2016 | Basavaiah | |
| 2005/0010929 A1* | 1/2005 | Wang | H04L 63/1425 719/318 |
| 2006/0294058 A1 | 12/2006 | Zabback et al. | |
| 2007/0168336 A1 | 7/2007 | Ransil et al. | |
| 2008/0294384 A1* | 11/2008 | Fok | H04M 1/72597 702/187 |
| 2011/0314148 A1* | 12/2011 | Petersen | G06F 11/3476 709/224 |
| 2013/0332601 A1* | 12/2013 | Nakil | H04L 41/147 709/224 |
| 2014/0215574 A1 | 7/2014 | Erb et al. | |
| 2016/0359713 A1* | 12/2016 | Shi | H04L 43/16 |
| 2017/0099365 A1* | 4/2017 | Jain | H04L 67/327 |
| 2017/0316343 A1* | 11/2017 | Shamsi | G06N 20/00 |
| 2018/0089258 A1 | 3/2018 | Bhattacharjee et al. | |

* cited by examiner

*Primary Examiner* — Benjamin R Bruckart
*Assistant Examiner* — Tien M Nguyen
(74) *Attorney, Agent, or Firm* — Adeli LLP

(57) ABSTRACT

Logging includes accessing a plurality of logs associated with network traffic in a distributed networking environment; selecting a subset of logs among the plurality of logs, wherein a log selection rate is pre-specified; determining weights associated with logs in the subset of logs; and collecting log information, including weight information of logs in the subset of logs relative to the plurality of logs.

27 Claims, 10 Drawing Sheets

LOG THROTTLING

CROSS REFERENCE TO OTHER APPLICATIONS

This application claims priority to U.S. Provisional Patent Application No. 62/670,996 entitled LOG THROTTLING filed May 14, 2018 which is incorporated herein by reference for all purposes.

BACKGROUND OF THE INVENTION

Modern networking systems often include logging subsystems for collecting logs. The logs provide insight into the traffic that is transmitted and received by the networking system. Analysis based on the logs allows operators to adjust system configurations, and thereby improve system performance.

In large-scale networks such as data centers and enterprise networks, high volumes of traffic can be transmitted and received, which means that large number of logs may be generated in connection with monitoring the traffic. Collecting and processing all the logs would require large amounts of resources such as memory, storage, and processors, which in turn would lead to high capital expenditure and/or impact on the performance of the rest of the system. Thus, it is often necessary to reduce the number of logs collected. Existing techniques for reducing the number of logs often have certain drawbacks. For example, the sampling-by-fraction techniques can lead to unpredictable resource requirements because the traffic rate is unpredictable. Further, under samplings can cause samples that are most representative of the characteristics of traffic to be missed. A log reduction technique that requires a predictable amount of computing resources and collects sample logs that are representative of traffic characteristics is therefore needed.

BRIEF DESCRIPTION OF THE DRAWINGS

Various embodiments of the invention are disclosed in the following detailed description and the accompanying drawings.

DETAILED DESCRIPTION

Figure 1:
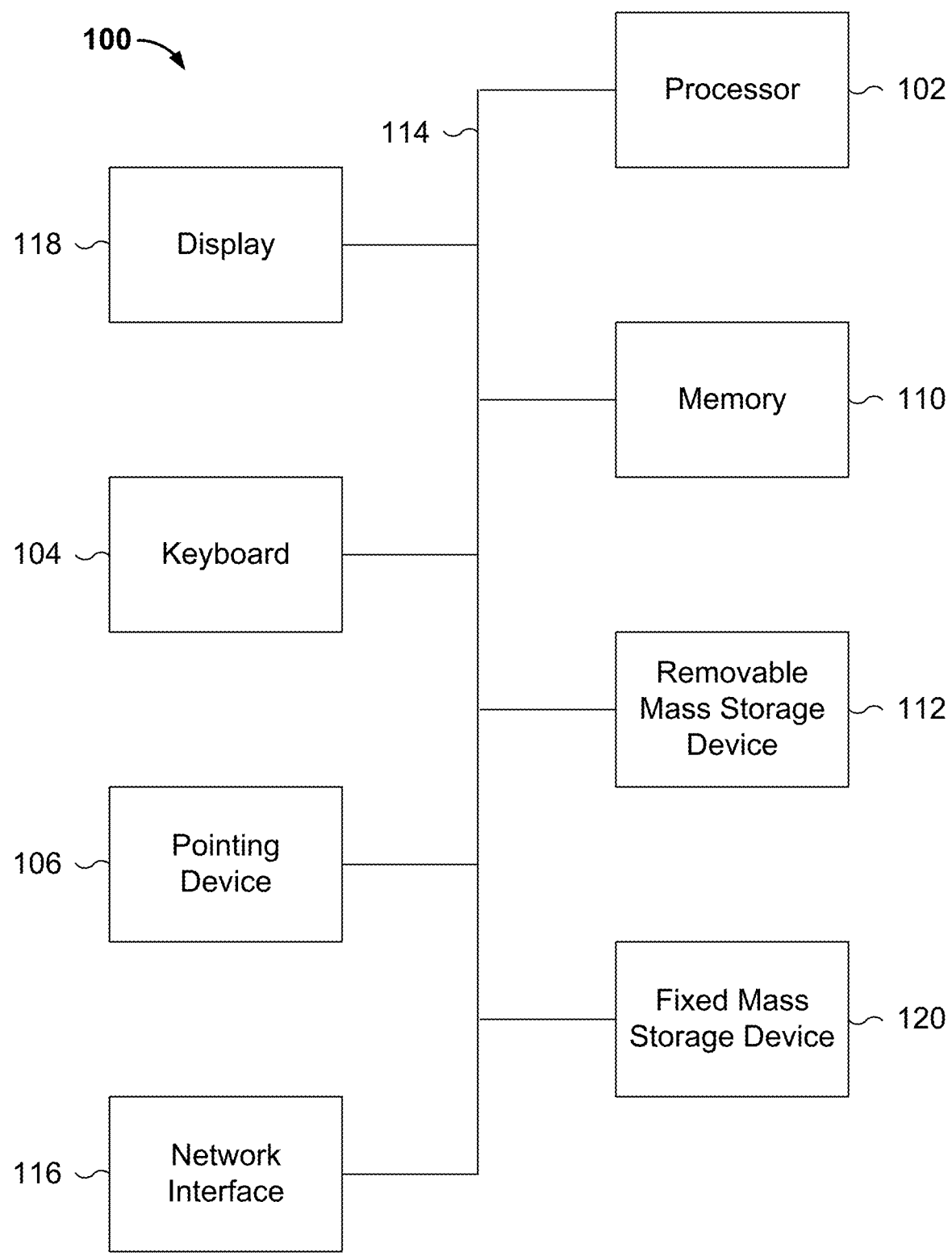
FIG. 1 is a functional diagram illustrating a programmed computer system for log collection in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, generated logs refer to the all logs that are generated as traffic is processed by the networking system. Collected logs refer to those logs that are collected (e.g., stored, outputted) by a logging system and to be further analyzed. Collected logs are typically a subset of the generated logs.

In certain logging systems, a "sampling-by-fraction" approach is used to reduce the number of logs being collected. For example, sampling-by-0.1 collects one log for every ten logs generated. Because the generated log rate depends on traffic rate, which varies over time and is difficult to predict, the amount of resources required to support log collection is also difficult to predict. For example, suppose that the log system is configured to do sampling-by-0.1, when the traffic rate is at its peak and 1 million requests per second is received, the number of logs to be collected would go to 100,000 per second. The logging system may end up competing for resources (e.g., memory required to buffer the collected logs, bandwidth for outputting the collected logs, etc.) with the rest of the networking system's services such as load balancing, firewall, virtual private networks (VPN), etc. Further, the system operators would have a difficult time allocating the resources ahead of time because the number of logs is proportional to traffic, which is difficult to predict. To address these problems, the system operators often have to overprovision the system, thus lead to increased cost. As described in greater detail below, a log throttling technique that collects a subset of logs at a pre-specified rate overcomes the shortcomings associated with the sampling-by-fraction approach as well as other approaches with unpredictable resource requirements. Log system's efficiency and ease of management are improved.

FIG. 1 is a functional diagram illustrating a programmed computer system for log collection in accordance with some embodiments. As will be apparent, other computer system architectures and configurations can be used to collect logs. Computer system 100, which includes various subsystems as described below, includes at least one microprocessor subsystem (also referred to as a processor or a central processing unit (CPU)) 102. For example, processor 102 can be implemented by a single-chip processor or by multiple processors/processor cores. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide functions described below with respect to server 202, etc. of FIG. 2.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2A:
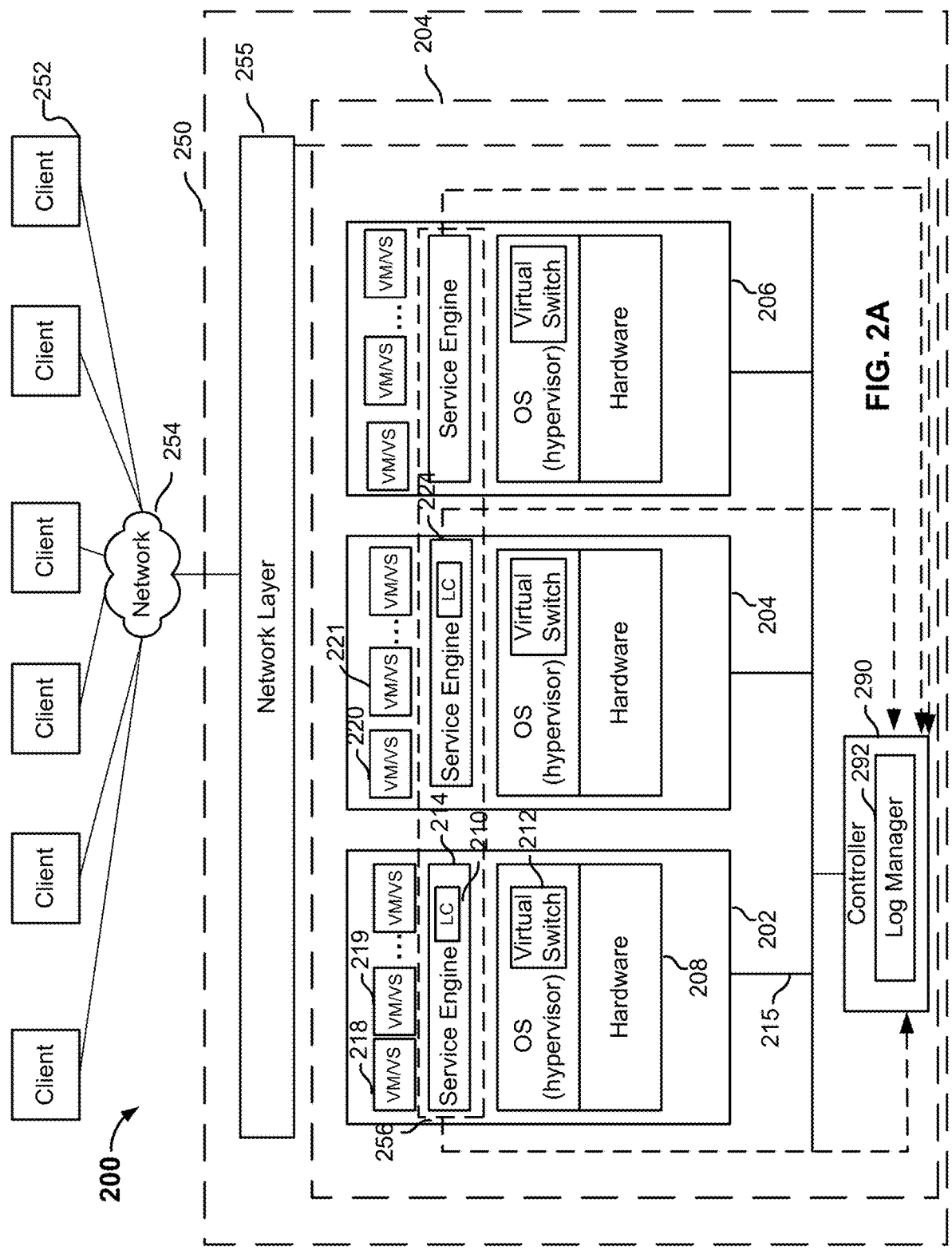
FIG. 2A is a block diagram illustrating an embodiment of a system including a distributed network service platform.

FIG. 2A is a block diagram illustrating an embodiment of a system including a distributed network service platform. In this example, client devices such as 252 connect to a data center 250 via a network 254. A client device can be a laptop computer, a desktop computer, a tablet, a mobile device, a smart phone, a wearable networking device, or any other appropriate computing device. In some embodiments, a web browser and/or a standalone client application is installed at each client, enabling a user to use the client device to access certain server applications (also referred to as virtual services) hosted by data center 250. Network 254 can be the Internet, a private network, a hybrid network, or any other communications network.

In the example shown, a networking layer 255 comprising networking devices such as routers, switches, etc. forwards requests from client devices 252 to a distributed network service platform 204. In this example, distributed network service platform 204 includes a number of servers configured to provide a distributed network service. A physical server (e.g., 202, 204, 206, etc.) has hardware components and software components, and can be implemented using a device such as 100. In this example, hardware (e.g., 208) of the server supports operating system software in which a number of virtual machines (VMs) (e.g., 218, 219, 220, etc.) are configured to execute. A VM is a software implementation of a machine (e.g., a computer) that simulates the way a physical machine executes programs. The part of the server's operating system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include the VMware Workstation® and Oracle VM VirtualBox®. Although physical servers supporting VM architecture are shown and discussed extensively for purposes of example, physical servers supporting other architectures such as container-based architecture (e.g., Kubernetes®, Docker®, Mesos®), standard operating systems, etc., can also be used and techniques described herein are also applicable. In a container-based architecture, for example, the applications are executed in special containers rather than virtual machines.

In some embodiments, instances of applications are configured to execute on the VMs. In some embodiments, a single application corresponds to a single virtual service. Examples of such virtual services include web applications such as shopping cart, user authentication, credit card authentication, email, file sharing, virtual desktops, voice/video streaming, online collaboration, and many others. In some embodiments, a set of applications is collectively referred to as a virtual service. For example, a web merchant can offer shopping cart, user authentication, credit card authentication, product recommendation, and a variety of other applications in a virtual service. Multiple instances of the same virtual service can be instantiated on different devices. For example, the same shopping virtual service can be instantiated on VM 218 and VM 220. The actual distribution of the virtual services depends on system configuration, run-time conditions, etc. Running multiple instances of the virtual service on separate VMs provide better reliability and more efficient use of system resources.

One or more service engines (e.g., 214, 224, etc.) are instantiated on a physical device. In some embodiments, a service engine is implemented as software executing in a virtual machine. The service engine is executed to provide distributed network services for applications executing on the same physical server as the service engine, and/or for applications executing on different physical servers. In some embodiments, the service engine is configured to enable appropriate service components. For example, a load balancer component is executed to provide load balancing logic to distribute traffic load amongst instances of applications executing on the local physical device as well as other physical devices; a firewall component is executed to provide firewall logic to instances of the applications on various devices; a metrics agent component is executed to gather metrics associated with traffic, performance, etc. associated with the instances of the applications; etc. Many other service components may be implemented and enabled as appropriate. When a specific service is desired, a corresponding service component is configured and invoked by the service engine to execute in a VM. In some embodiments, the service engine also implements a log collector (also referred to as the log agent) 210 which generates and collects log data based on traffic. Details of the log collector are described below.

In the example shown, traffic received on a physical port of a server (e.g., a communications interface such as Ethernet port 215) is sent to a virtual switch (e.g., 212). In some embodiments, the virtual switch is configured to use an application programming interface (API) provided by the hypervisor to intercept incoming traffic designated for the application(s) in an inline mode, and send the traffic to an appropriate service engine. In inline mode, packets are forwarded on without being replicated. As shown, the virtual switch passes the traffic to a service engine in the distributed network service layer (e.g., the service engine on the same physical device), which transforms the packets if needed and redirects the packets to the appropriate application. The service engine, based on factors such as configured rules and operating conditions, redirects the traffic to an appropriate application executing in a VM on a server.

Controller 290 is configured to control, monitor, program, and/or provision the distributed network services and virtual machines. In particular, the controller includes a log manager 292 configured to receive logs collected by the service engines, perform analytical operations, output the logs and/or analytics results to be further analyzed or displayed, etc. The controller can be implemented as software, hardware, firmware, or any combination thereof. In some embodiments, the controller is implemented on a system such as 100. In some cases, the controller is implemented as a single entity logically, but multiple instances of the controller are installed and executed on multiple physical devices to provide high availability and increased capacity. In embodiments implementing multiple controllers, known techniques such as those used in distributed databases are applied to synchronize and maintain coherency of data among the controller instances.

In this example, the service engine receives traffic from clients and/or virtual services. The log collector monitors logs that are generated based on the traffic. As will be described in greater detail below, the log collector also makes determinations regarding which logs to collect and/or which logs to discard. By collecting a subset of the logs and limiting the rate of logs to be collected, the amount of resources required to support the log function is predictable. For example, if each log is 1 KB and 10 logs are collected per second, the log data is collected at the rate of 10 kB/second. The amount of storage required for the logs for a given amount of time can thus be computed and provisioned (e.g., 300 GB/year). Correspondingly, the network bandwidth used (10 KB/sec) is around 80 Kbps (kilobits per second) to transfer the data. The collected logs are sent to controller 290 to be aggregated, analyzed, and/or output to another application to be further analyzed and/or displayed. Other appropriate actions can be taken.

The components and arrangement of distributed network service platform 204 described above are for purposes of illustration only. The technique described herein is applicable to network service platforms having different components and/or arrangements.

Figure 2B:
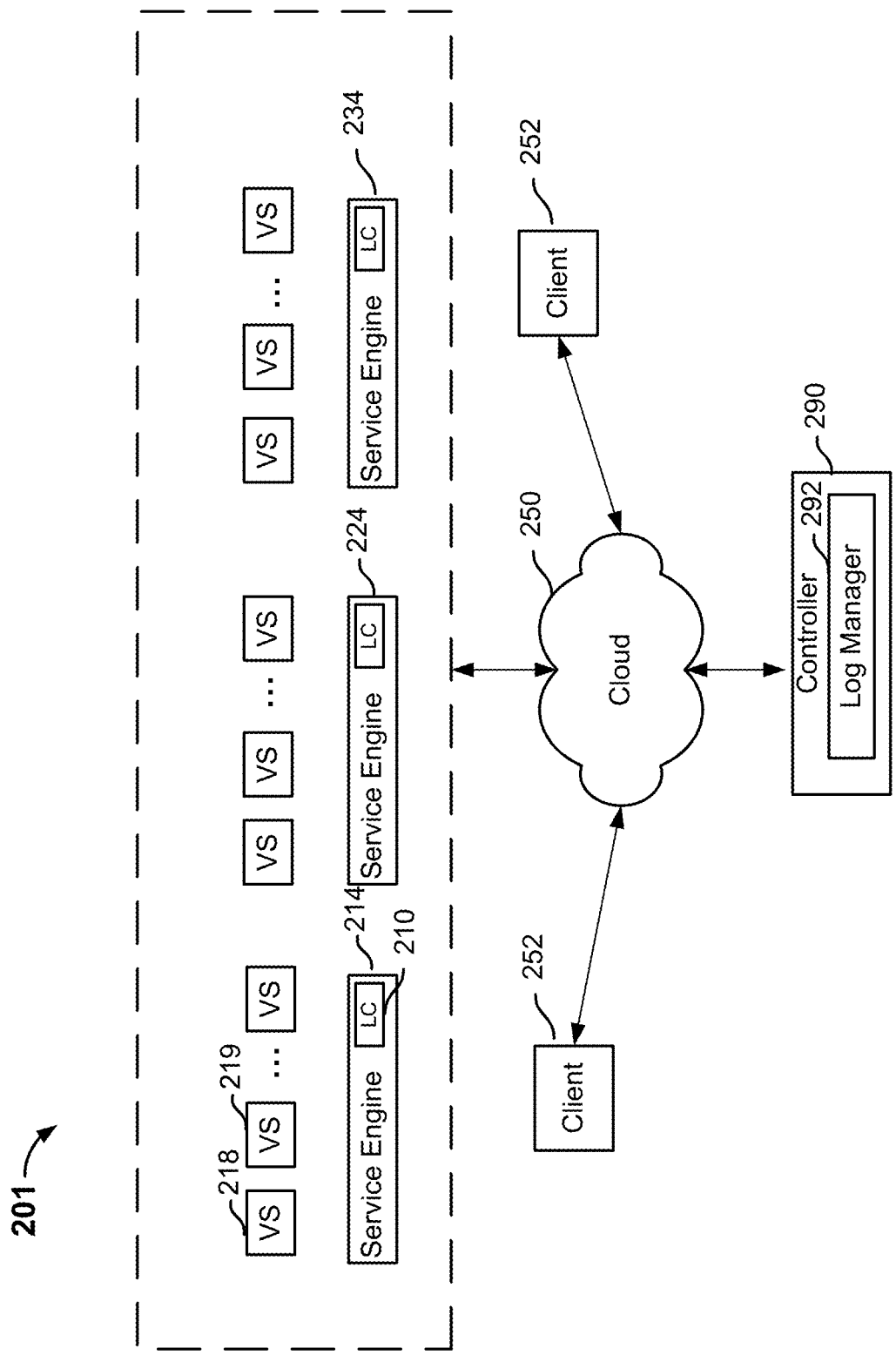
FIG. 2B is a block diagram illustrating another embodiment of a distributed network service system.

FIG. 2B is a block diagram illustrating another embodiment of a distributed network service system. In this example, a cloud-based computing platform 250 is used to implement distributed network service system 201 and provide networking and virtualization services. Examples of the cloud-based computing platform include Amazon Web Service™ (AWS), Microsoft Azure™, etc. Certain aspects of the system (such as the OS, the hypervisor, the hardware, etc.) can vary depending on implementation and are omitted in the figure. Virtual services and service engines are installed on virtual machines provided by the cloud-based computing platform. The virtual services, service engines, controller, and log manager are similar to the counterparts shown in FIG. 2A, but the operations of the hypervisor can be abstracted and/or hidden. Clients such as 252 and controller 290 are configured to communicate with the virtual services and/or service engines via APIs provided by the platform.

In both systems 200 and 250, log collectors such as 210 collect logs based on traffic received by the service engines. The traffic can be packets sent by client device destined for virtual services, and/or packets sent by virtual services destined for client devices. Depending on the need of the application, a log can be formatted to include various information relating to traffic. For example, in a transaction, a service engine receives a request from a client, and forwards the request to a backend server. The backend server sends a response to the service engine, and the service engine forwards that response to the client. In a log, information relating to each stage of the transaction can be collected. An example log for a transaction includes the following fields: request type, source address (e.g., source IP address), destination address (e.g., destination URL), and response code indicating whether a transaction has been successfully processed. Different log formats including additional or different log fields can be used in other embodiments.

Figure 3:
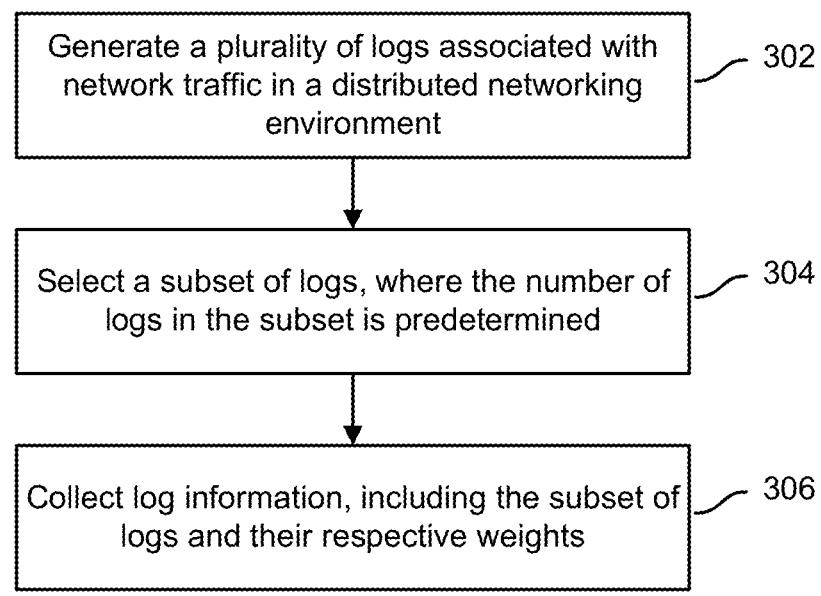
FIG. 3 is a flowchart illustrating an embodiment of a log collection process.

FIG. 3 is a flowchart illustrating an embodiment of a log collection process. Process 300 can be performed by a system such as 100 or 202. In some embodiments, process 300 is performed by a service engine 214 of FIG. 2A or FIG. 2B.

At 302, a plurality of logs associated with network traffic in a distributed networking environment is accessed (e.g., read, received, etc.). In some embodiments, the logs are generated by the service engine based on traffic flowing through the service engine. For example, a load balancer executing on the service engine will generate logs based on received packets that are to be load balanced on different virtual service instances. Other network services such as firewall, VPN, etc. can also generate logs. In some embodiments, the IP stack of the service engine's application includes log generation APIs that record log fields. For example, a log may include information about the type of traffic (e.g., hypertext transfer protocol (HTTP) GET, PUT, or POST request), the source (e.g., the client internet protocol (IP) address), and the destination (e.g., a specific universal resource locator (URL)) which are determined based on the packet's content.

At 304, a subset of the generated logs is selected. This can be performed periodically (e.g., every second, every 10 seconds, etc.) In this example, the rate of logs selected to be included in the subset is predetermined. For example, the service engine may be configured to select 10 logs per second. The selection is also referred to as log throttling as in most situations the generated logs are throttled (restricted) to produce the subset of logs.

Although the sampling-by-fraction approach previously described tends to result in unpredictable resource requirements, because the logs are sampled uniformly, the sampled logs would provide statistical guarantees on the characteristics information about the traffic. For example, suppose that 1000 logs per second are generated and a uniform sampling yields 100 collected logs. Of the 100 collected logs, 50% are destined for universal resource locator (URL) A. Thus, it can be inferred with some accuracy that 50% of all the traffic are destined for URL A (e.g., "foo.com/home.html.") On the other hand, the log throttling technique may require 10 logs per second to be collected. Because sometimes fewer logs (only 10 out of 1000 per second) are obtained and the sampling is not necessarily uniform, it is challenging for the log throttling technique to provide as accurate profiling information as the logs from sampling-by-fraction. Thus, the log throttling technique uses additional information such as weights of the logs to better preserve characteristics information about the traffic.

At 306, the log information pertaining to the subset of logs is collected. The log information includes the logs themselves as well as weight information of the logs in the subset relative to the generated logs. Collecting the log information includes sending the log information to the log manager to be exported (e.g., output to analytics software), stored (e.g., write to disk storage), analyzed, displayed, or other appropriate post processing. In some embodiments, the log information includes weight information. The weight information associated with a log indicates the number or proportion of logs in the generated logs that are represented by the log. In some embodiments, the number or proportion of logs with the same selected characteristics as the log is set as the weight. In some embodiments, the number of dropped logs of the same type as the selected log is used as the weight. The weight information is used by analytics tools to make inferences about the characteristics of the traffic without having to record all the logs. For example, suppose that in one hour's worth of collected logs, the number of logs selected based on destination of URL A is 150 and their weights add up to 1,000,000, it can be inferred that 1,000,000 requests are destined for URL A. This information can be presented to the user to provide insight about the URL, such as its popularity and number of compute resources that should be dedicated to service the URL in order to prevent outages. The information also gives the application developers insight into which portions of the application should be optimized to provide better service to the client.

In some embodiments, the logs that are generated are temporarily stored in a first buffer. Once the subset of the logs is collected, the first buffer is freed up and reused for obtaining more logs in the next cycle.

By selecting logs at a fixed rate, the amount of resources required to store (either temporarily during log collection or more permanently for log analytics) and process the logs is predetermined and therefore can be more easily controlled and provisioned.

Details for selecting the predetermined number of logs and determining weights are described in more detail below in connection with FIGS. 4, 5, and 6.

Figure 4:
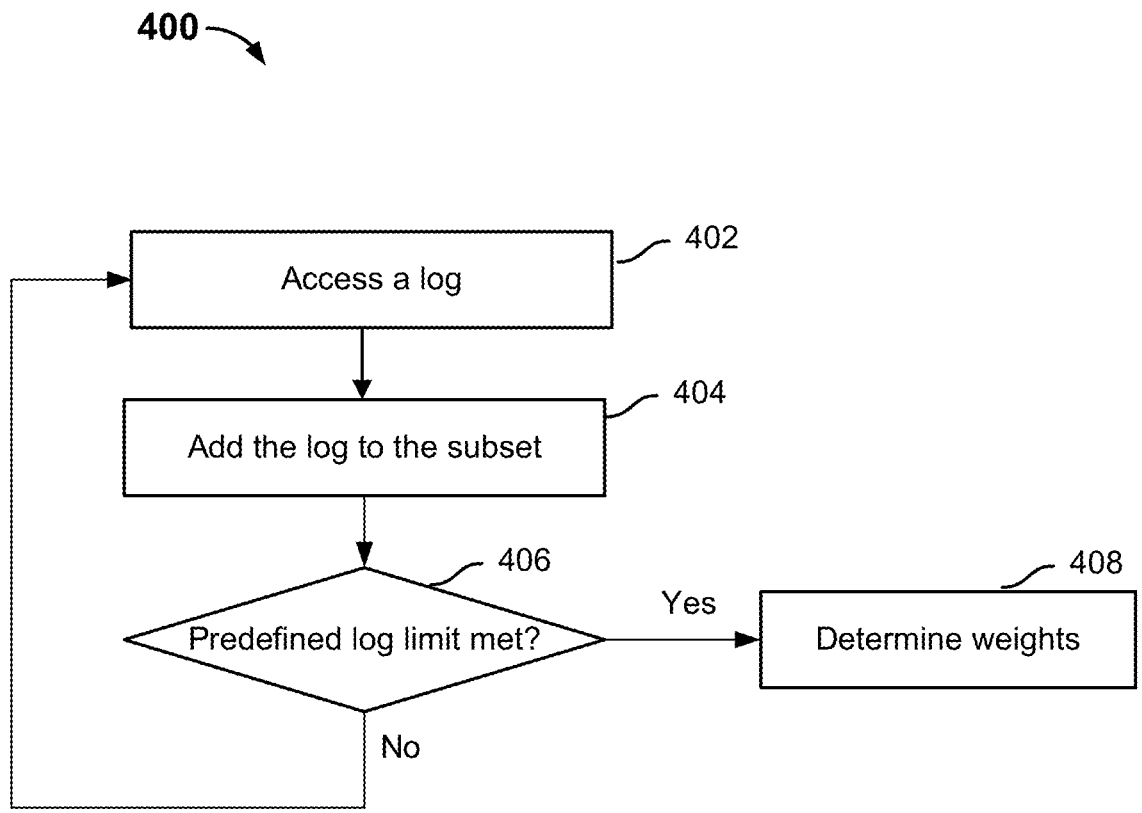
FIG. 4 is a flowchart illustrating an embodiment of a process for selecting a subset of logs and determining their weights.

FIG. 4 is a flowchart illustrating an embodiment of a process for selecting a subset of logs and determining their weights. Process 400 can be used to implement at least a part of 304 and 306 of process 300.

In this example, a rate of logs to be selected is predefined. In other words, a fixed number (N) of logs are to be selected in a time interval. This is referred to as the predefined log limit.

At 402, a log is accessed. The log can be a generated log that is stored in a receive buffer. In some embodiments, the log is accessed as soon as it is placed in the receive buffer.

In some embodiments, the receive buffer is filled during the time interval, and an individual log is accessed at the end of the time interval.

At 404, the log is added to the subset, and the count for the number of logs in the subset is incremented.

At 406, it is determined whether the number of logs in the subset meets the predefined log limit. If no, control returns to 402 and the next log in the receive buffer is processed. 401-406 repeats until the number of logs in the subset meets the predefined log limit at 406, at which point no more logs are collected for this cycle and the weights of the logs in the subset are determined at 408.

Process 400 is repeated periodically (e.g., every second, every five seconds) to collect N logs for each time interval. In this way, the first N logs received during the time interval are collected. If N is greater than the total number of generated logs, then all the generated logs are collected. In most situations, however, N is less than the total number of generated logs.

In some embodiments, the weight is proportional to the number of logs a selected log represents. Because the logs collected are random and not dependent on their content, it is assumed in some embodiments that the logs in the subset have equal weight (in other words, the weights are evenly distributed). For example, if during a time interval 4 logs are collected out of 10 generated logs, the weight is 10/4=2.5. If during a time interval 4 logs are collected out of 1000 generated logs, the weight is 1000/4=250. In some embodiments, the weights are normalized. In some embodiments, the weights are assigned based on the number of logs in the previous time period. For instance, suppose that 4 logs per second are collected. In the N-th second, if 100 logs are received, then 100 is used as the numerator when computing weights for the (N+1)-th second. If 4 logs are collected in the (N+1)-th second, the weight is 100/4 for each log.

In some embodiments, Process 400 can also be used to randomly select logs from a receive buffer. At 402, a log in the receive buffer is randomly chosen and added to the subset in 404. The process continues to randomly select logs for the subset until N logs are chosen for the subset. In such a case, the weights are also evenly distributed.

Figure 5:
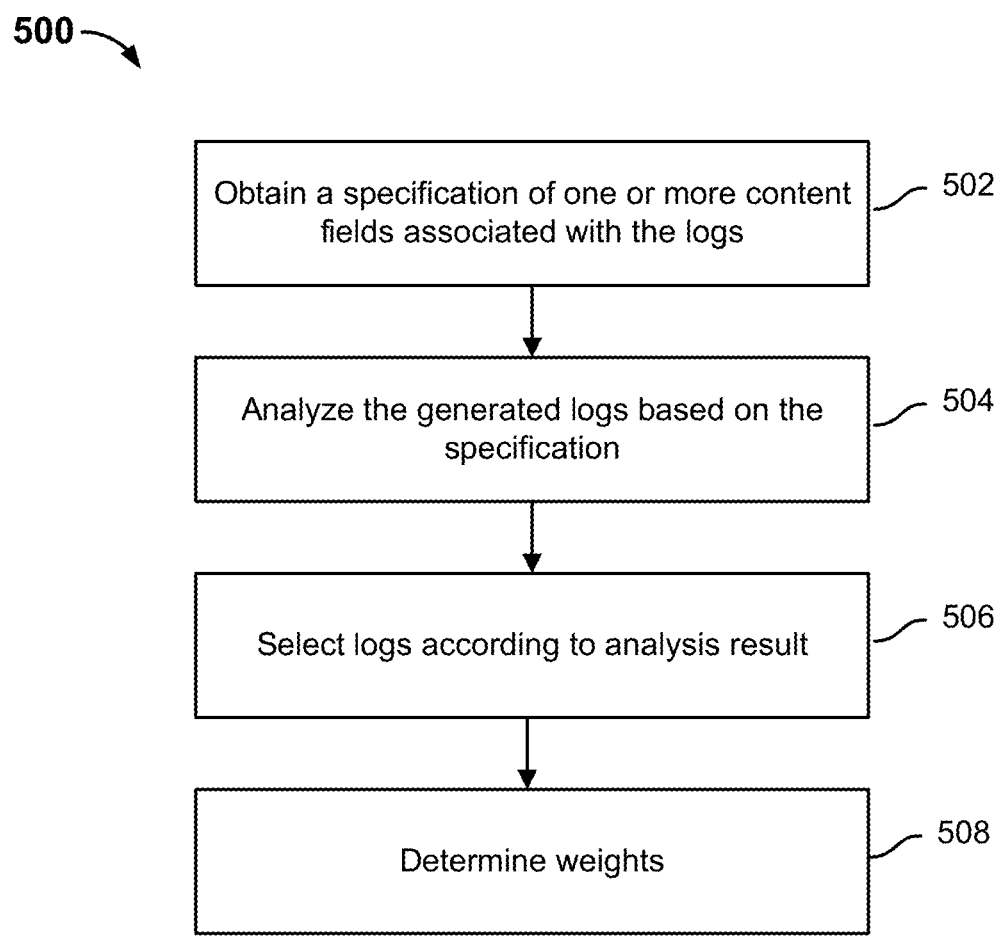
FIG. 5 is a flowchart illustrating an embodiment of a process for selecting a subset of logs and determining their weights.

FIG. 5 is a flowchart illustrating an embodiment of a process for selecting a subset of logs and determining their weights. Process 500 can be used to implement at least a part of 304 and 306 of process 300. In this example, the generated logs are selected based on their content, and weights are assigned according to distribution of the content.

In this example, the generated logs (e.g. logs generated during a time interval) are stored in such a way that their content fields can be queried. For example, the logs can be stored in a database table where the rows correspond to logs and the columns correspond to the content fields of the logs. Queries can be performed on the content fields (also referred to as dimensions). Other structures can be used to organize the log data to provide filtering, grouping, and labelling functions.

At 502, a specification of one or more content fields associated with the logs is obtained. The specification can be made by an administrator user through a configuration tool to indicate the dimension(s) on which log query and analysis will take place. The specification can be obtained via a configuration file, a configuration API, or the like. The specification can indicate the content field(s) of interest, how analysis is to be performed for the content field(s) of interest, etc. In some embodiments, the analysis includes determining the distribution of values in the content field(s) of interest. For example, the specification can indicate that the content field of interest is the request type field in the log, and analysis is to be performed on the 5 most frequent request types among the generated logs. In another example, the specification can indicate that the content field of interest is the destination URL, and analysis is to be performed on the 5 most popular destination URLs among the generated logs. In some embodiments, the specification can indicate that analysis is to take place on the 5 least frequent request types, 5 least popular destination URLs, etc. The specification can also indicate combinations of fields of interest (e.g., the source IP address and the destination URL), and analysis is to be performed on the top 5 most popular (or least popular) source-destination combinations. Many other specifications can be made in other embodiments.

At 504, the generated logs are analyzed according to the specification. In particular, the logs are analyzed in the content field(s) of interest. For example, the distributions of different values for the specified content field(s) are determined. In various embodiments, according to the specifications, logs are analyzed to identify logs with the 5 most frequent request types, the 5 least frequent request types, the 5 most popular destination URLs, the 5 most popular source-destination combinations, or the 5 least popular source-destination combinations, etc.

At 506, the logs are selected according to analysis result to form the subset. For example, in each of the 5 most frequently requested types, one log is randomly selected to be included in the subset of logs; in each of the 5 most popular destination URLs, one log is randomly selected to be included in the subset, etc., At 508, the weights are determined. In this example, the weight is computed based at least in part on the number of logs with the same type of content, and indicates how representative the selected log is relative to the generated logs. For example, among 1000 generated logs, the 5 most popular destination URLs appeared 500, 200, 100, 50, and 20 times. Suppose that one log is selected for each of the top 5 destination URLs. The weights, which correspond to the number of logs a selected log represents, are therefore 500, 200, 100, 50, and 20, respectively. Suppose that the specification requires 3 logs to be selected for the most frequently accessed destination URL (which appeared 500 times), then the weight associated with each of the 3 logs is 500/3.

In embodiments where the logs are selected based on multiple dimensions, the weight can be represented as a tuple. For example, a log with a destination URL of URL1 and a client IP of CIP1 can be assigned a weight tuple <23, 20> to indicate that URL1 appeared 23 times in the interval and CIP1 appeared 20 times in the interval.

The above embodiments require the weights to be computed and added to the logs, which requires additional processing at the time of collection. In some embodiments, the weights are not explicitly computed and added at the time of collection; rather, the logs are given identifiers (IDs) when they are generated. The IDs are stored with the collected logs, and are used as weight information for determining weights as needed.

Figure 6:
FIG. 6 is a diagram illustrating an embodiment of an example that uses identifiers as weight information.

FIG. 6 is a diagram illustrating an embodiment of an example that uses identifiers as weight information. In this example, during a time interval, 10 logs with identifiers 21-30 are generated. The identifiers are sequential and unique during the time interval. Logs with identifiers of 21, 23, 29 and 30 are selected. The logs can be selected randomly or based on content as described in processes 400 or 500 above. The weights are determined based on the number of immediately adjacent, discarded logs, which can be determined based on the IDs of the collected logs. In this example, for a specific log, the weight is computed based on the number of immediately preceding discarded logs+1. In other words, a selected log represents all the immediately preceding discarded logs plus itself. Thus, the weight for log 21 is 1 (because no immediately preceding log has been discarded); the weight for log 23 is 1+1=2 (because there is one immediately preceding log, log 22, that has been discarded); the weight for log 29 is 5+1=6 (because there are five immediately preceding logs, logs 24-28, that have been discarded); and the weight for log 30 is 1 (because there is no immediately preceding log that has been discarded). Other ways of determining the weight can be employed in other embodiments. For example, the weight of missing logs can be distributed to all of the immediately following log(s). With this approach, both log 29 and log 30 will receive a weight of 5/2+1=3.5, which corresponds to the weight of 5 missing logs 24-28 distributed among logs 29 and 30 that immediately follow the missing logs. Computing the weights based on log identifiers allows the logs to be directly collected and stored without modification, thus improving efficiency at log collection time and offers the flexibility of computing weights at a later time.

Further, in some embodiments, priority settings can be assigned to logs for the purposes of throttling. For example, three priority settings are available in some embodiments: "significant" logs that correspond to certain pre-specified types of requests or connections (e.g., requests ending with a 4XX response code); "filtered" (also referred to as user-defined (UDF)) logs that correspond to requests or connections that match user-defined filters; and "non-significant" logs that correspond to all other requests or connections outside of significant or filtered logs. Other priority settings can be configured in other embodiments. When there is high volume of logs, higher priority logs are selected while lower priority logs may be dropped.

As discussed above in connection with FIGS. 2A and 2B, each service engine can service multiple instances of virtual services (applications), and each virtual service can have multiple instances that are serviced by multiple service engines. In some embodiments, the system is configured to provide multiple levels of log throttling. For instance, one level of throttling happens at the virtual service level. A virtual service can be configured to throttle the logs pertaining to the virtual service.

The configuration options can be made available via a command line interface (CLI) or a graphical user interface (GUI) to the user. In some embodiments, the CLI or GUI tools are provided to the user by the controller. Once saved, the configuration settings are applied to the virtual services by the controller.

Figure 7:
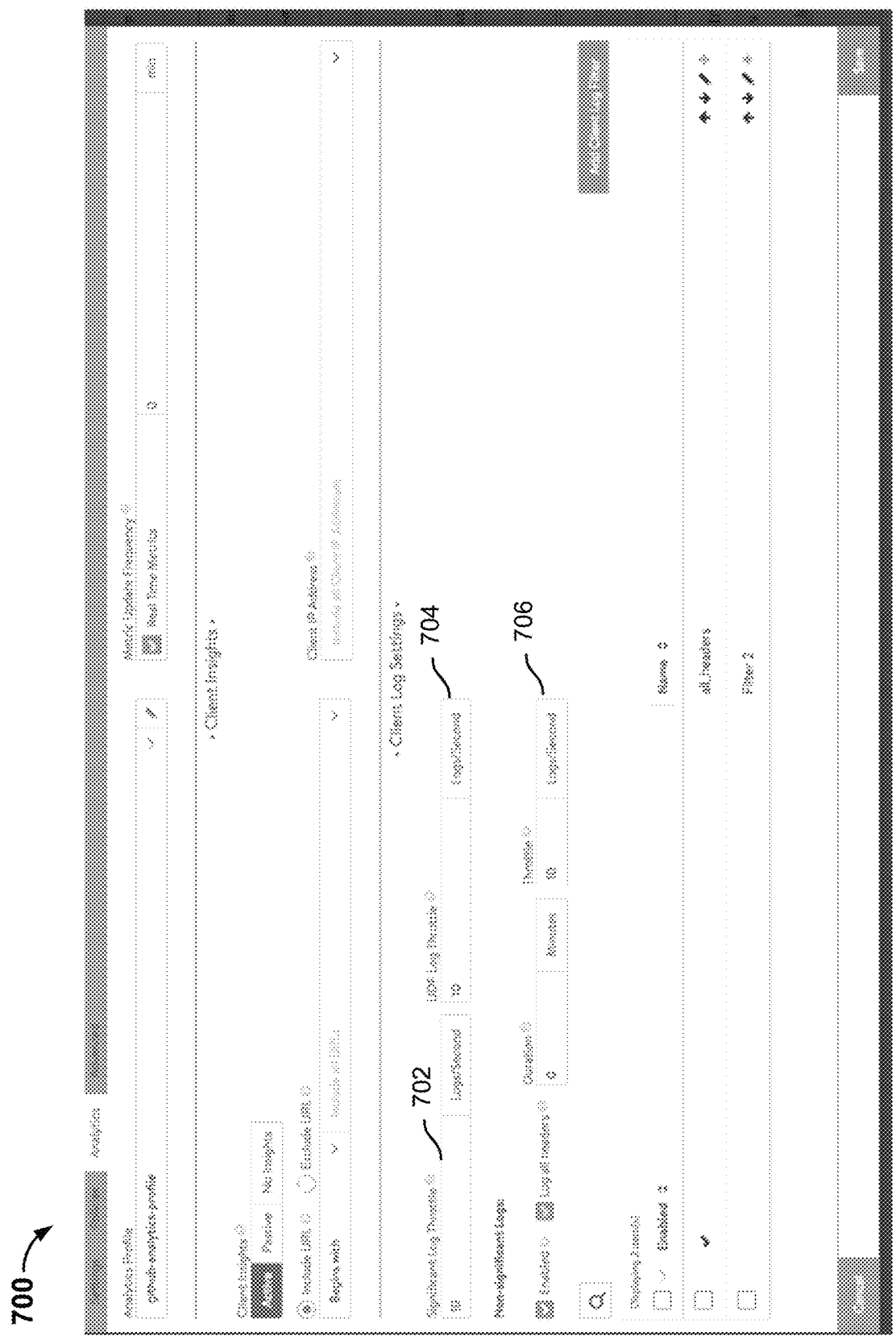
FIG. 7 is a screenshot of an example GUI for configuring throttling at the virtual service level.

FIG. 7 is a screenshot of an example GUI for configuring throttling at the virtual service level. In this example, the analytics profile for a specific virtual service is configured. Edit interface 700 provides edit box 702 used to configure the throttling rate for significant logs, edit box 704 used to configure the throttling rate for UDF logs, and edit box 706 for non-significant logs. In this example, the throttling rates are configured to be 10 logs/second for each instance of a virtual service. Thus, if there are two instances of the same virtual service placed on two separate service engines, at most 20 logs/second are collected for that virtual service. Other implementations are possible in different embodiments. For example, the total throttling rate can be fixed for a virtual service regardless of how many instances there are. Thus, if there are 2 virtual service instances, each instance is equivalently configured to have a throttling rate of 5 logs/second. In some embodiments, the throttling rates can also be configured individually for different instances.

In some embodiments, another level of throttling happens at the service engine level. A CLI or GUI tool provided by the controller can be used to configure a service engine to throttle the logs pertaining to the service engine. The configuration settings are applied to the service engine by the controller.

Figure 8:
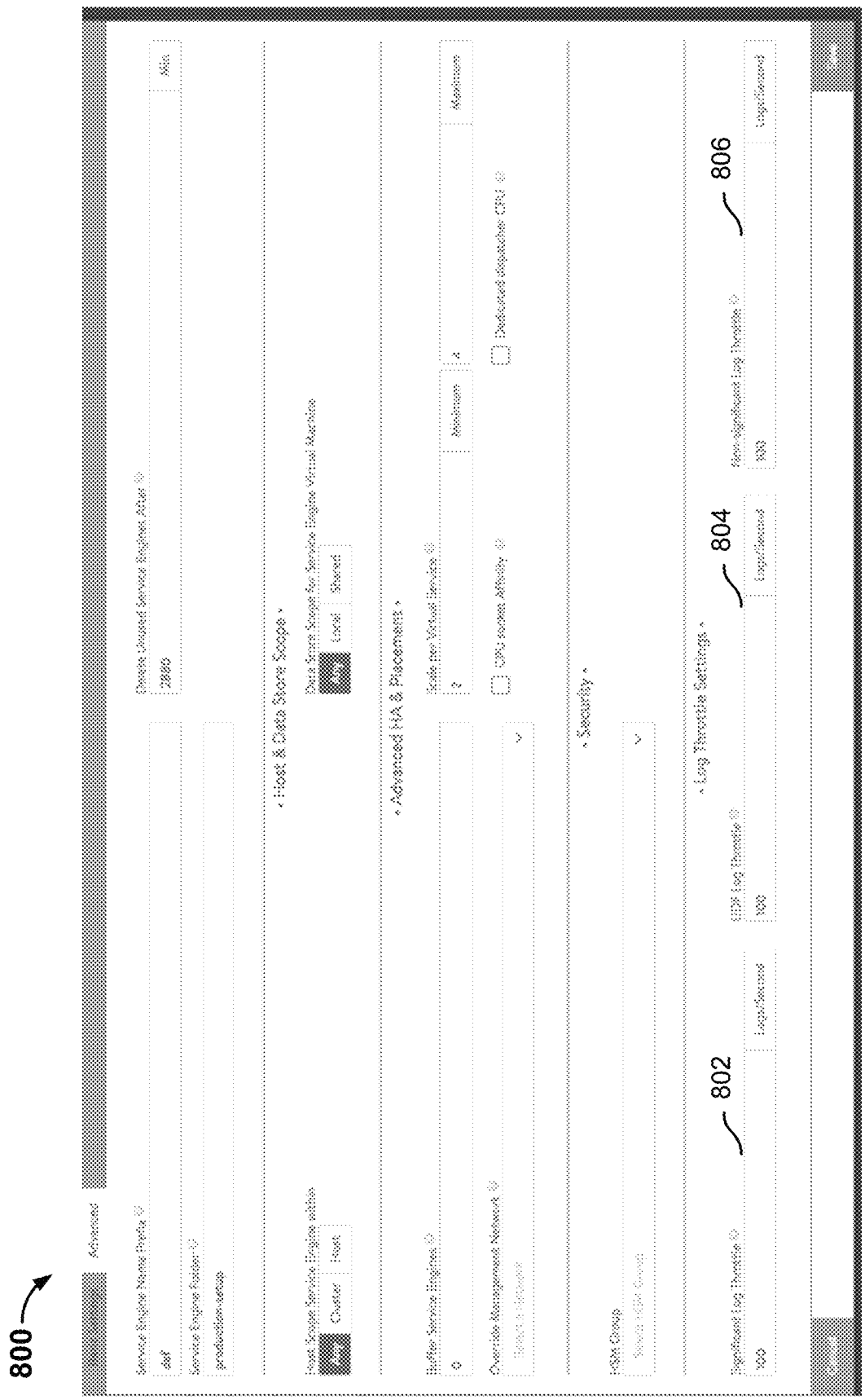
FIG. 8 is a screenshot of an example GUI for configuring throttling at the service engine level.

FIG. 8 is a screenshot of an example GUI for configuring throttling at the service engine level. Edit interface 800 provides edit boxes 802, 804, and 806 to configure the throttling rates for significant logs, UDF logs, and non-significant logs, respectively. The throttling rates apply to all the logs processed by the service engine regardless of the virtual services. In this example, the configuration context is a service engine group, and therefore each member in the service engine group gets the same throttling rate configurations. In other embodiments, the configuration context is an individual service engine, and different throttling rates can be configured for different service engines.

Figure 9:
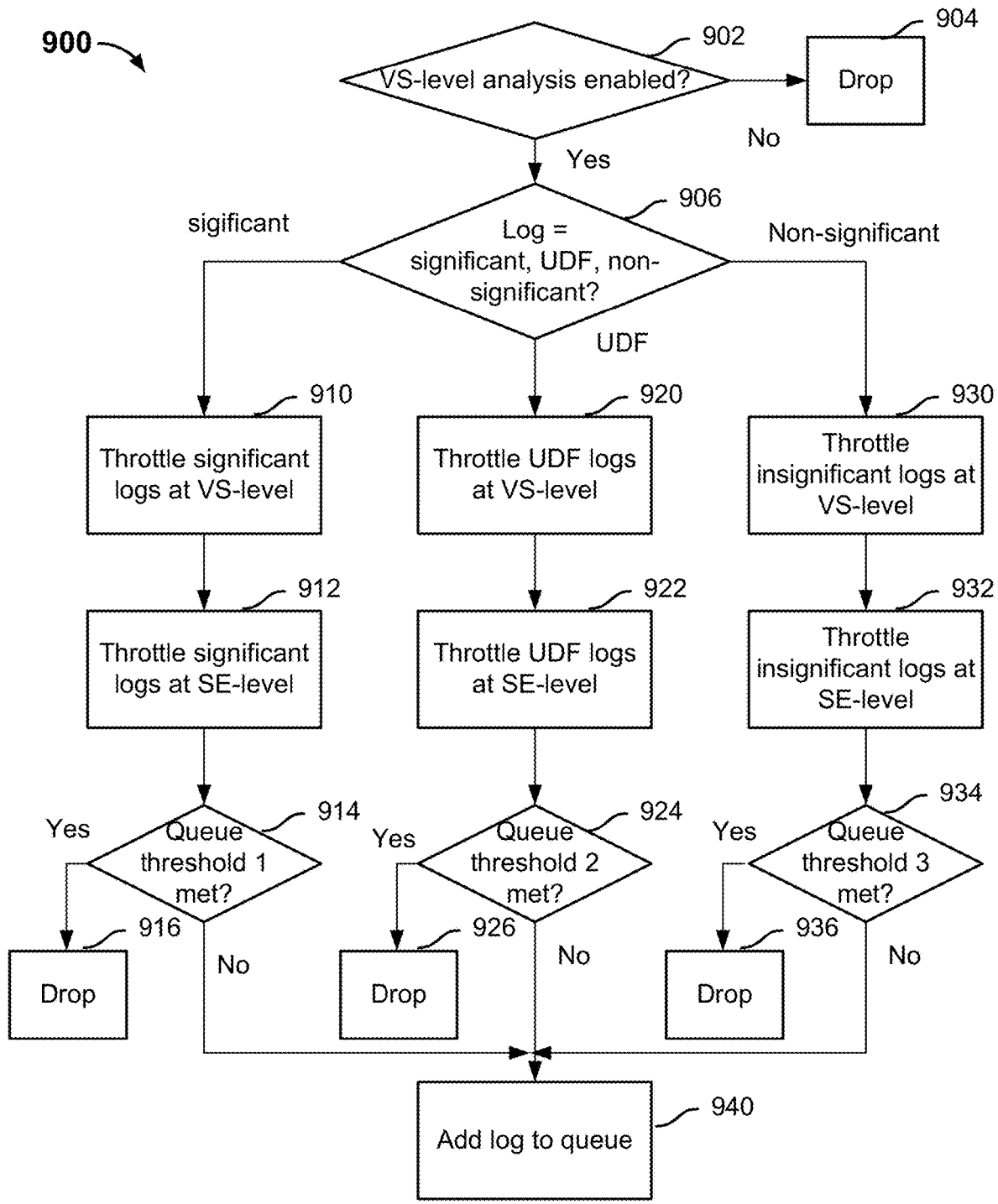
FIG. 9 is a flowchart illustrating an embodiment of a process of log collection subject to various levels of throttling.

FIG. 9 is a flowchart illustrating an embodiment of a process of log collection subject to various levels of throttling. Process 900 can be performed by a system such as 100 or 202.

Process 900 is applied to a generated log. The process can be applied as the log is generated, or when a time interval has passed and logs generated during the time interval are retrieved from the buffer and processed.

At 902, whether virtual service-level analysis is enabled is determined. This determination can be done by checking a configuration setting. If virtual service-level analysis is not enabled, the log is dropped (i.e., not collected).

If virtual service-level analysis is enabled, the priority setting of the log is checked. Depending on the priority setting, the log is handled by a corresponding processing path. A significant log (e.g., a log of certain pre-defined type) is first throttled at the virtual service level, at 910. In particular, the number of logs collected in the time interval for the virtual service level is checked against a virtual service level threshold, and if the threshold has been met, the log is dropped. Otherwise, the log is further throttled at the service engine level, at 912. In particular, the number of logs collected in the time interval for the service engine is checked against a service engine level threshold, and if the threshold has been met, the log is dropped. Similarly, the UDF logs are throttled at the virtual service level at 920, then at the service engine level at 922. The nonsignificant logs are throttled at the virtual service level at 930, then at the service engine level at 932.

In this example, the collected logs are placed in the same queue to be output. The priority settings correspond to different priority setting-based queue thresholds. The queue threshold corresponding to significant logs is 100%. That is, at 914, it is determined whether the queue threshold has been met. If 100% of the queue has been filled, the log is dropped, at 916. The queue threshold corresponding to UDF logs is 70%, which means that at 924, if it is determined that 70% of the queue has been filled, the log is dropped, at 926. The queue threshold corresponding to nonsignificant logs is 50%, which means that at 934, if 50% of the queue has been filled, the log is dropped at 936. If a log has not been dropped, it is added to the queue at 940, and the corresponding numbers of collected logs for the virtual service and the service engine are incremented.

Log collection by throttling has been disclosed. By restricting the rate of logs that are selected, a predictable number of logs are collected and the amount of resources needed to store, analyze, and otherwise support the logs is deterministic and can be pre-allocated. Further, because the logs are collected with weight information, information about dropped logs is preserved in the collected logs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for selectively providing logging data to a log manager from each of a plurality of service engines that perform a service operation on data message flows, the method comprising:
   at a first host computer that executes a particular service engine to perform a service operation on data message flows sent or received by a virtual machine (VM) executing on the first host computer separately from the particular service engine:
      generating a plurality of logs associated with network traffic processed by the particular service engine;
      performing a sampling operation (1) to select a subset of logs among the plurality of generated logs in order to limit a number of resources required to store and process the logs and (2) to compute, for the selected subset of logs, a set of weight values to indicate how representative each particular log in the selected subset of logs is relative to the generated plurality of logs; and
      providing, to a central log manager executing on a second host computer, the subset of generated logs and the computed set of weight values for the log manager to use in a computation that quantifies a characteristic of the generated plurality of logs and thereby of the network traffic processed by the particular service engine.

2. The method of claim 1, wherein the log manager receives subsets of logs generated at the plurality of service engines.

3. The method of claim 2, wherein the service operation performed by the plurality of service engines comprises at least one of a firewall operation, a load balancing operation, and a virtual private network (VPN) operation.

4. The method of claim 1, wherein the selected subset of generated logs comprises N log samples in a time interval, wherein N is an integer.

5. The method of claim 1, wherein the selected subset of generated logs comprises a random sampling of the plurality of generated logs according to a preconfigured sample rate.

6. The method of claim 1, wherein the set of weights comprises, for each particular log in the selected subset, a weight value that indicates a proportion of logs in the plurality of logs that are represented by the particular log.

7. The method of claim 1, wherein:
   the set of weights associated with the subset of generated logs comprises a single weight value associated with each log in the subset of generated logs.

8. The method of claim 1, wherein:
   performing the sampling operation to select the subset of logs among the plurality of generated logs comprises performing the sampling operation to select the subset of generated logs based at least in part on log content.

9. The method of claim 8, wherein:
   the log content comprises at least one of: request type, source address, destination address, and response code.

10. The method of claim 8, wherein:
    performing the sampling operation to compute the set of weights associated with each log in the selected subset of logs comprises performing the sampling operation to compute the set of weights based at least in part on log content distributions in the generated plurality of logs.

11. The method of claim 1, wherein performing the sampling operation to select the subset of generated logs comprises performing the sampling operation to select a subset of the plurality of logs for each of a set of service operations performed by the particular service engine.

12. The method of claim 1, wherein the generated plurality of logs has a corresponding plurality of priority settings, and performing the sampling operation to select the subset of logs comprises checking for a priority setting-based threshold associated with a log before selecting the log to be in the selected subset of logs.

13. The method of claim 1, wherein the generated plurality of logs has a corresponding plurality of log identifiers, and the weight of a log in the subset of logs is determined based at least in part on logs with the same log identifiers not included in the subset of logs.

14. A computing device comprising:
    a set of processing units;
    a non-transitory machine readable medium storing a program for execution by the set of processing units, the program for selectively providing logging data to a log manager from a particular service engine that performs a service operation on data message flows, the program comprising sets of instructions for:
       at a first host computer that executes the particular service engine to perform a service operation on data message flows sent or received by a virtual machine (VM) executing on the host computer separately from the particular service engine:
          generating a plurality of logs associated with network traffic processed by the particular service engine;
          performing a sampling operation (1) to select a subset of logs among the plurality of generated logs in order to limit a number of resources required to store and process the logs and (2) to specify, for the selected subset of logs, a set of weight values to represent a characteristic of the generated plurality of logs; and
          providing, to a central log manager executing on a second host computer, the subset of generated logs and the specified set of weight values for the log manager to use in a computation that quantifies a characteristic of the generated plurality of logs and thereby of the network traffic processed by the particular service engine.

15. The computing device of claim 14, wherein the log manager receives subsets of logs generated at the plurality of service engines.

16. The computing device of claim 15, wherein the service operation performed by the plurality of service engines comprises at least one of a firewall operation, a load balancing operation, and a virtual private network (VPN) operation.

17. The computing device of claim 14, wherein the selected subset of generated logs comprises N log samples in a time interval, wherein N is an integer.

18. The computing device of claim 14, wherein the selected subset of generated logs comprises a random sampling of the plurality of generated logs according to a preconfigured sample rate.

19. The computing device of claim 14, wherein the set of weights comprises, for each particular log in the selected subset, a weight value that indicates at least one of (i) a number of logs in the plurality of generated logs represented by the particular log and (ii) a proportion of logs in the plurality of logs that are represented by the particular log.

20. The computing device of claim 14, wherein:
the set of weights associated with the subset of generated logs comprises a single weight value associated with each log in the subset of generated logs.

21. The computing device of claim 14, wherein the set of instructions for performing the sampling operation to select the subset of logs among the plurality of generated logs comprises a set of instructions for performing the sampling operation to select the subset of generated logs based at least in part on log content.

22. The computing device of claim 21, wherein:
the log content comprises at least one of: request type, source address, destination address, and response code.

23. The computing device of claim 21, wherein:
the set of instructions for performing the sampling operation to specify the set of weights associated with each log in the selected subset of generated logs comprises a set of instructions for performing the sampling operation to specify the set of weights based at least in part on log content distributions in the generated plurality of logs.

24. The computing device of claim 14, wherein the set of instructions for performing the sampling operation to select the subset of generated logs comprises a set of instructions for performing the sampling operation to select a subset of the plurality of logs for each of a set of service operations performed by the particular service engine.

25. The computing device of claim 14, wherein the generated plurality of logs has a corresponding plurality of priority settings, and the set of instructions for performing the sampling operation to select the subset of logs comprises a set of instructions for checking for a priority setting-based threshold associated with a log before selecting it to be in the selected subset of logs.

26. The computing device of claim 14, wherein the generated plurality of logs has a corresponding plurality of log identifiers, and the weight of a log in the subset of logs is determined based at least in part on logs with the same log identifiers not included in the subset of logs.

27. A non-transitory machine readable medium storing a program for execution by a set of processing units, the program for selectively providing logging data to a log manager from a particular service engine in a plurality of service engines that perform a service operation on data message flows, the program comprising sets of instructions for:
at a first host computer that executes the particular service engine to perform a service operation on data message flows sent or received by a virtual machine (VM) executing on the host computer separately from the particular service engine:
collecting log data for network traffic received and processed by a particular service engine in the plurality of service engines;
generating a plurality of logs associated with network traffic processed by the particular service engine;
performing a sampling operation (1) to select a subset of logs among the plurality of generated logs in order to limit a number of resources required to store and process the logs and (2) to compute, for the selected subset of logs, a set of weight values to indicate how representative each particular log in the selected subset of logs is relative to the generated plurality of logs; and
providing, to a central log manager executing on a host second computer, the subset of generated logs and the computed set of weight values for the log manager to use in a computation that quantifies a characteristic of the generated plurality of logs and thereby of the network traffic processed by the particular service engine.

* * * * *